(12) United States Patent
Hughes

(10) Patent No.: US 7,303,237 B1
(45) Date of Patent: Dec. 4, 2007

(54) HEADREST DEVICE, KIT AND METHOD OF USING

(76) Inventor: Derek Hughes, 16 Hertford Avenue, East Sheen, London (GB) SW14 8EE ( * ) Notice: Subject to any disclaimer, the term of this patent is extended or adjusted under 35 U.S.C. 154(b) by 2 days.

(21) Appl. No.: 11/365,396

(22) Filed: Mar. 1, 2006

(51) Int. Cl.
A47C 7/38 (2006.01)

(52) U.S. Cl. .................. 297/391; 297/181; 297/220; D6/601; 5/636

(58) Field of Classification Search ........... 297/391, 297/181, 220; D6/601; 5/636
See application file for complete search history.

(56) References Cited

U.S. PATENT DOCUMENTS

| | | | |
|---|---|---|---|
| 5,398,996 A * | 3/1995 | Steiner | 297/391 |
| 5,964,504 A * | 10/1999 | Hogan et al. | 297/220 X |
| 6,224,158 B1 * | 5/2001 | Hann | 297/391 |
| 6,386,761 B1 * | 5/2002 | Bohnsack | D6/601 X |
| 2002/0140271 A1* | 10/2002 | Owen | 297/391 |
| 2007/0035163 A1* | 2/2007 | Andrews | 297/391 X |

* cited by examiner

Primary Examiner—Rodney B White

(57) ABSTRACT

A headrest device, kit and associated method is disclosed for use in mounting the device onto a top part of a backrest of a chair in a vehicle. The device comprises a headrest post, a first swath of fabric, a plastic sleeve, a second swath of fabric, and a cushion. The headrest post has a generally U-shape configuration with a generally rectangular base and two substantially parallel prongs extending from the base of the headrest post for insertion into the backrest of the chair of the vehicle. The first swath of fabric is attached to the rectangular base of the headrest post and has an exposed surface. The plastic sleeve is detachably attached to the rectangular base of the headrest post. The second swath of fabric is attached to the plastic sleeve, and has an exposed facade. The second swath of fabric is detachably attached to the first swath of fabric when the exposed facade of the second swath of fabric contacts the exposed surface of the first swath of fabric. The cushion has an exterior, an interior, a stylized geometric sports ball shape and a centrally disposed orifice, the cushion is attached to the plastic sleeve, in which a portion of the plastic sleeve is mounted within the orifice of the cushion. The kit comprises the unassembled components of the device. The method of using comprises the steps of adjoining, affixing, locking, obtaining, removing, and unlocking.

20 Claims, 2 Drawing Sheets

HEADREST DEVICE, KIT AND METHOD OF USING

FIELD OF THE INVENTION

The present invention relates headrest devices for use in automobiles, more particularly to a headrest device having a removable stylized cushion shaped in a sports ball configuration.

DESCRIPTION OF THE PRIOR ART

Headrests for automobile vehicles seats are widely known in the art. They may form an integral part of the backrest or may be attached thereto by clips of insertable parts. A wide variety of headrest devices is currently available on the commercial market and an even larger number of these types of devices are known in the art of headrest devices, for example, the adjustable head rest for vehicle seats disclosed by Herzer et al. in U.S. Pat. No. 3,572,834; the headrest disclosed by Itoh in U.S. Pat. No. 5,139,310; the vehicle seat head rest disclosed by Belk in U.S. Pat. No. D296,855; the automobile sleeper headrest disclosed by Ortiz in U.S. Pat. No. D341,734; the vehicle head neck rest disclosed by Bell and Bell in U.S. Pat. No. D373,275; and the head rest for vehicle seat disclosed by Maree et al. in U.S. Pat. No. D398,793.

While all of the above-described devices fulfill their respective, particular objectives and requirements, the aforementioned patents do not describe a headrest device having a headrest post, a first swath of fabric, a plastic sleeve, a second swath of fabric, and a cushion, in which the cushion a stylized geometric sports ball shape and a centrally disposed orifice. This combination of elements would specifically match the user's particular individual needs of making it possible to provide to a user a means for displaying a cushion having a stylized sports ball shape as well as a providing a means for supporting the head of the user while driving in the vehicle. The. above-described patents make no provision for a headrest device having a headrest post, a first swath of fabric, a plastic sleeve, a second swath of fabric, and a cushion, in which the cushion a stylized geometric sports ball shape and a centrally disposed orifice.

Therefore, a need exists for a new and improved headrest device having a headrest post, a first swath of fabric, a plastic sleeve, a second swath of fabric, and a cushion, in which the cushion a stylized geometric sports ball shape and a centrally disposed orifice. In this respect, the headrest device according to the present invention substantially departs from the conventional concepts and designs of the prior art, and in doing so provides an apparatus primarily developed for the purpose of providing a means for displaying a cushion having a stylized sports ball shape as well as a means for supporting the head of the user while driving in the vehicle.

SUMMARY OF THE INVENTION

The present device, kit and method of using, according to the principles of the present invention, overcomes the shortcomings of the prior art by providing a headrest device, kit and method of using is disclosed in which the device comprises a headrest post, a first swath of fabric, a plastic sleeve, a second swath of fabric, and a cushion. The headrest post has a generally U-shape configuration with a generally rectangular base and two substantially parallel prongs extending from the base of the headrest post for insertion into the backrest of the chair of the vehicle. The first swath of fabric is attached to the rectangular base of the headrest post and has an exposed surface. The plastic sleeve is detachably attached to the rectangular base of the headrest post. The second swath of fabric is attached to the plastic sleeve, and has an exposed facade. The second swath of fabric is detachably attached to the first swath of fabric when the exposed facade of the second swath of fabric contacts the exposed surface of the first swath of fabric. The cushion has an exterior, an interior, a stylized geometric sports ball shape and a centrally disposed orifice, the cushion is attached to the plastic sleeve, in which a portion of the plastic sleeve is mounted within the orifice of the cushion. The kit comprises the unassembled components of the device. The method of using comprises the steps of adjoining, affixing, locking, obtaining, removing, and unlocking.

In view of the foregoing disadvantages inherent in the known type headrest devices now present in the prior art, the present invention provides an improved headrest device, which will be described subsequently in great detail, is to provide a new and improved headrest device which is not anticipated, rendered obvious, suggested, or even implied by the prior art, either alone or in any combination thereof.

To attain this, the present invention essentially comprises a headrest post, a first swath of fabric, a plastic sleeve, a second swath of fabric, and a cushion. The headrest post has a generally U-shape configuration with a generally rectangular base and two substantially parallel prongs extending from the base of the headrest post for insertion into the backrest of the chair of the vehicle. The first swath of fabric is attached to the rectangular base of the headrest post and has an exposed surface. The plastic sleeve is detachably attached to the rectangular base of the headrest post. The second swath of fabric is attached to the plastic sleeve, and has an exposed facade. The second swath of fabric is detachably attached to the first swath of fabric when the exposed facade of the second swath of fabric contacts the exposed surface of the first swath of fabric. The cushion has an exterior, an interior, a stylized geometric sports ball shape and a centrally disposed orifice, the cushion is attached to the plastic sleeve, in which a portion of the plastic sleeve is mounted within the orifice of the cushion.

There has thus been outlined, rather broadly, the more important features of the invention in order that the detailed description thereof that follows may be better understood, and in order that the present contribution of the art may be better appreciated.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved headrest device that has all the advantages of the prior art headrest device and none of the disadvantages.

It is another object of the present invention to provide a new and improved headrest device that may be easily and efficiently manufactured and marketed.

An even further object of the present invention is to provide a new and improved headrest device that has a low cost of manufacture with regard to both materials and labor, and which accordingly is then susceptible of low prices of sale to the consuming public, thereby making such multi-purpose storage unit and system economically available to the buying public.

Still another object of the present invention is to provide a new headrest device that provides in the apparatuses and methods of the prior art some of the advantages thereof, while simultaneously overcoming some of the disadvantages normally associated therewith.

Even still another object of the present invention is to provide a headrest device having a headrest post, a first swath of fabric, a plastic sleeve, a second swath of fabric, and a cushion, in which the cushion a stylized geometric sports ball shape and a centrally disposed orifice. This combination of elements makes it possible to provide a user a means of displaying a cushion having a stylized sports ball shape as well as means of supporting the head of the user while driving in the vehicle.

Still another object of the present invention is to provide a kit comprising the unassembled components of the device.

Lastly, it is an object of the present invention to provide a new and improved method of using comprising the steps of adjoining, affixing, locking, obtaining, removing, and unlocking.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
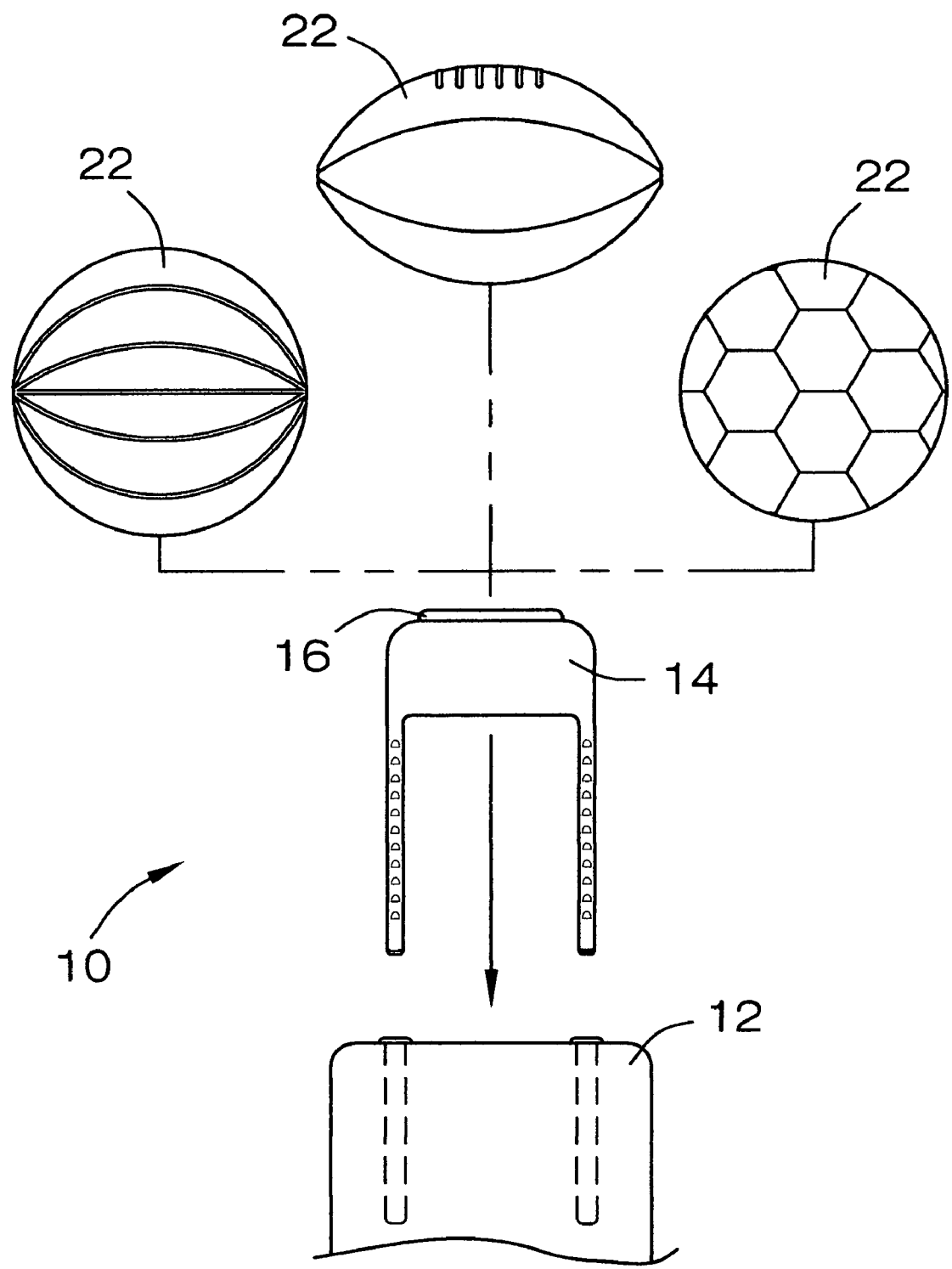
FIG. 1 is an exploded view of a preferred embodiment of the headrest device constructed in accordance with the principles of the present invention.
Figures 2, 3:
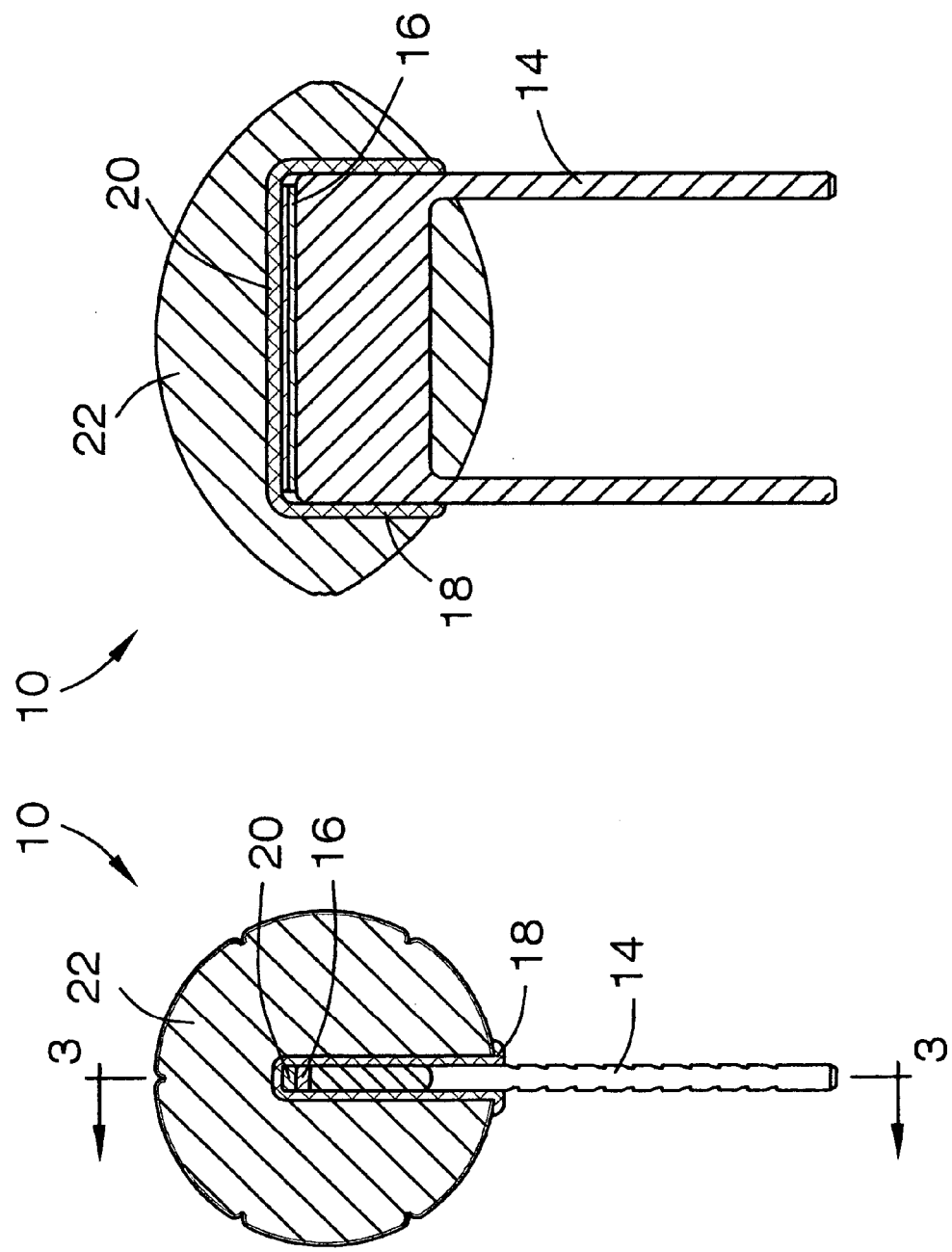
FIG. 2 is a cross sectional side view of a preferred embodiment of the headrest device of the present invention.
FIG. 3 is a cross sectional front view of a preferred embodiment of the headrest device of the present invention.

Referring now to the drawings, and in particular FIG. 1 to 3 thereof, one preferred embodiment of the present invention is shown and generally designated by the reference numeral 10. One preferred embodiment of a headrest device 10 for mounting onto a top part of a backrest 12 of a chair in a vehicle, the device 10 comprises: a headrest post 14, a first swath 16 of fabric, a plastic sleeve 18, a second swath 20 of fabric, and a cushion 22. The headrest post 14 has a generally U-shape configuration with a generally rectangular base and two substantially parallel prongs extending from the base of the headrest post 14. The first swath 16 of fabric is attached to the rectangular base of the headrest post 14, wherein the first swath 16 of fabric having an exposed surface. The plastic sleeve 18 is detachably attached to the rectangular base of the headrest post 14. The second swath 20 of fabric is attached to the plastic sleeve 18, in which the second swath 20 of fabric has an exposed facade. The second swath 20 of fabric is detachably attached to the first swath 16 of fabric when the exposed facade of the second swath 20 of fabric contacts the exposed surface of the first swath 16 of fabric. The cushion 22 has an exterior, an interior, a stylized geometric sports ball shape and a centrally disposed orifice, the cushion 22 attached to the plastic sleeve 18, in which a portion of the plastic sleeve 18 is mounted within the orifice of the cushion 22.

One preferred configuration of the first swath 16 of fabric may comprise a plurality of minuscule loops extending outwardly from the exposed surface of the first swath 16 of fabric, in which the second swath 20 of fabric comprises a complementary plurality of minuscule hooks extending outwardly from the exposed facade of the second swath 20 of fabric. Another preferred configuration of the first swath 16 of fabric comprises a plurality of minuscule hooks extending outwardly from the exposed surface of the first swath 16 of fabric, in which the second swath 20 of fabric having a plurality of minuscule loops extending outwardly from the exposed facade of the second swath 20 of fabric.

The stylized geometric sports ball shape of the cushion 22 may be any type of sports ball shape selected from the group consisting of a stylized geometric football shape, a stylized geometric baseball shape, a stylized geometric basketball shape, a stylized geometric soccer ball shape, a stylized geometric rugby ball shape, a stylized geometric golf ball shape, a stylized geometric tennis ball shape, a stylized geometric volleyball shape, a stylized geometric billiard ball shape, a stylized geometric ping pong ball shape, and a stylized geometric ice hockey puck shape.

The exterior of the cushion 22 may be selected from the group consisting of leather, cotton, wool, nylon, polyester, polypropylene, polyurethane, and mixtures thereof.

The interior of the cushion 22 may be selected from the group consisting of foam rubber, cotton, wool, nylon, polyester, polypropylene, polyurethanes, polyacryls, polymethacryls, cellulosic polymers, styrene-acryl copolymers, polystyrene-polyacryl mixtures, polysiloxanes, polyesters, urethane-acryl copolymers, siloxane-urethane copolymers, polyurethane-polymethacryl mixtures, silicone-acryl copolymers, vinyl acetate polymers, or mixtures thereof.

One preferred embodiment of a kit for assembling a headrest device 10 for mounting onto a top part of a backrest 12 of a chair in a vehicle, in which the kit comprises a headrest post 14, a first swath 16 of fabric, a plastic sleeve 18, a second swath 20 of fabric, and a cushion 22. The headrest post 14 has a generally U-shape configuration with a generally rectangular base and two substantially parallel prongs extending from the base of the headrest post 14. The first swath 16 of fabric is attached to the rectangular base of the headrest post 14, in which the first swath 16 of fabric has an exposed surface. The plastic sleeve 18 is detachably attachable to the rectangular base of the headrest post 14. The second swath 20 of fabric is attached to the plastic sleeve 18, in which the second swath 20 of fabric having an exposed facade, wherein the second swath 20 of fabric is detachably attachable to the first swath 16 of fabric when the exposed facade of the second swath 20 of fabric contacts the exposed surface of the first swath 16 of fabric. The cushion 22 has an exterior, an interior, a stylized geometric sports ball shape and a centrally disposed orifice, the cushion 22 attached to the plastic sleeve 18, wherein a portion of the plastic sleeve 18 is mounted within the orifice of the cushion 22.

One preferred embodiment of a method of using a kit for assembling a headrest device 10 for mounting onto a top part of a backrest 12 of a chair in a vehicle, the method comprises the steps of adjoining, affixing, locking, obtaining, removing, and unlocking. The obtaining step comprises obtaining the kit comprising: a headrest post 14 having a generally U-shape configuration with a generally rectangular base and two substantially parallel prongs extending from the base of the headrest post 14; a first swath 16 of fabric attached to the rectangular base of the headrest post 14, the first swath 16 of fabric having an exposed surface; a plastic sleeve 18 detachably attachable to the rectangular base of the headrest post 14; a second swath 20 of fabric attached to the plastic sleeve 18, the second swath 20 of fabric having an exposed facade, wherein the second swath 20 of fabric is detachably attachable to the first swath 16 of fabric when the exposed facade of the second swath 20 of fabric contacts the exposed surface of the first swath 16 of fabric; and a cushion 22 having an exterior, an interior, a stylized geometric sports ball shape and a centrally disposed orifice, the cushion 22 attached to the plastic sleeve 18, wherein a portion of the plastic sleeve 18 is mounted within the orifice of the cushion 22, wherein the stylized geometric sports ball shape of the cushion 22 comprises a stylized geometric football shape. The affixing step comprises affixing slidably the headrest post 14 to top part of a backrest 12 of the chair in the vehicle. The adjoining step comprises adjoining slidably the cushion 22 to the base of the headrest post 14. The locking step comprises locking together the first swath 16 of fabric to the second swath 20 of fabric, wherein contacting the exposed surface of the first swath 16 of fabric attached to the rectangular base of the headrest post 14 to the exposed facade of the second swath 20 of fabric attached to the attached to the plastic sleeve 18. The unlocking step comprises unlocking the locked together the first swath 16 of fabric to the second swath 20 of fabric, wherein detaching exposed surface of the first swath 16 of fabric attached to the rectangular base of the headrest post 14 from the exposed facade of the second swath 20 of fabric attached to the attached to the plastic sleeve 18. The hoisting step comprises hoisting slidably upwards the cushion 22 from the base of the headrest post 14. The removing step comprises removing slidably the headrest post 14 from the top part of the backrest 12 of the chair in the vehicle.

Referring now to FIG. 1 which depicts an exploded view of an preferred embodiment of the headrest device 10 showing that the cushion 22 may consist of a stylized geometric football shape, a stylized geometric soccer ball shape, or a stylized geometric basketball shape.

Referring now to FIG. 2 and FIG. 3 which depict cross sectional views of a preferred embodiment of the headrest device 10 showing the cushion 22 attached to the backrest 12 with the plastic sleeve 18 interfaced between the two. Also shown is the first swath 16 of fabric detachably locked together with the second swath 20 of fabric.

As to the manner of usage and operation of the present invention, the same should be apparent from the above description. Accordingly, no further discussion relating to the manner of usage and operation will be provided.

While a preferred embodiment of the headrest device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A headrest device for mounting onto a top part of a backrest of a chair in a vehicle, said device comprising:

a headrest post having a generally U-shape configuration with a generally rectangular base and two substantially parallel prongs extending from the base of said headrest post;

a first swath of fabric attached to the rectangular base of said headrest post, said first swath of fabric having an exposed surface;

a plastic sleeve detachably attached to the rectangular base of said headrest post;

a second swath of fabric attached to said plastic sleeve, said second swath of fabric having an exposed facade, wherein said second swath of fabric is detachably attached to said first swath of fabric when said exposed facade of said second swath of fabric contacts said exposed surface of said first swath of fabric; and a cushion having an exterior, an interior, a stylized geometric sports ball shape and a centrally disposed orifice, said cushion attached to said plastic sleeve, wherein a portion of said plastic sleeve is mounted within the orifice of said cushion.

2. The device of Claim 1 wherein said first swath of fabric having a plurality of minuscule loops extending outwardly from the exposed surface of said first swath of fabric, and said second swath of fabric having a plurality of minuscule hooks extending outwardly from the exposed facade of said second swath of fabric.

3. The device of Claim 1 wherein said first swath of fabric having a plurality of minuscule hooks extending outwardly from the exposed surface of said first swath of fabric, and said second of fabric having a plurality of minuscule loops extending outwardly from the exposed facade of said second swath of fabric.

4. The device of claim 1 wherein the stylized geometric sports ball shape of said cushion comprises a stylized geometric football shape.

5. The device of claim 1 wherein the stylized geometric sports ball shape of said cushion comprises a stylized geometric baseball shape.

6. The device of claim 1 wherein the stylized geometric sports ball shape of said cushion comprises a stylized geometric basketball shape.

7. The device of claim 1 wherein the stylized geometric sports ball shape of said cushion comprises a stylized geometric soccer ball shape.

8. The device of claim 1 wherein the stylized geometric sports ball shape of said cushion comprises a stylized geometric rugby ball shape.

9. The device of claim 1 wherein the stylized geometric sports ball shape of said cushion comprises a stylized geometric golf ball shape.

10. The device of claim 1 wherein the stylized geometric sports ball shape of said cushion comprises a stylized geometric tennis ball shape.

11. The device of claim 1 wherein the stylized geometric sports ball shape of said cushion comprises a stylized geometric volleyball shape.

12. The device of claim 1 wherein the stylized geometric sports ball shape of said cushion comprises a stylized geometric billiard ball shape.

13. The device of claim 1 wherein the stylized geometric sports ball shape of said cushion comprises a stylized geometric ping pong ball shape.

14. The device of claim 1 wherein the stylized geometric sports ball shape of said cushion comprises a stylized geometric ice hockey puck shape.

15. The device of claim 1 wherein the exterior of said cushion is selected from the group consisting of leather, cotton, wool, nylon, polyester, polypropylene, polyurethane, and mixtures thereof.

16. The device of claim 1 wherein the interior of said cushion is selected from the group consisting of foam rubber, cotton, wool, nylon, polyester, polypropylene, polyurethanes, polyacryls, polymethacryls, cellulosic polymers, styrene-acryl copolymers, polystyrene-polyacryl mixtures, polysiloxanes, polyesters, urethane-acryl copolymers, siloxane-urethane copolymers, polyurethane-polymethacryl mixtures, silicone-acryl copolymers, vinyl acetate polymers, or mixtures thereof.

17. A kit for assembling a headrest device for mounting onto a top part of a backrest of a chair in a vehicle, said kit comprising:

a headrest post having a generally U-shape configuration with a generally rectangular base and two substantially parallel prongs extending from the base of said headrest post;

a first swath of fabric attached to the rectangular base of said headrest post, said first swath of fabric having an exposed surface;

a plastic sleeve detachably attachable to the rectangular base of said headrest post;

a second swath of fabric attached to said plastic sleeve, said second swath of fabric having an exposed facade, wherein said second swath of fabric is detachably attachable to said first swath of fabric when said exposed facade of said second swath of fabric contacts said exposed surface of said first swath of fabric; and a cushion having an exterior, an interior, a stylized geometric sports ball shape and a centrally disposed orifice, said cushion attached to said plastic sleeve, wherein a portion of said plastic sleeve is mounted within the orifice of said cushion.

18. The kit of claim 17 wherein said first swath of fabric having a plurality of minuscule loops extending outwardly from the exposed surface of said first swath of fabric, and said second swath of fabric having a plurality of minuscule hooks extending outwardly from the exposed facade of said second swath of fabric.

19. The kit of claim 17 wherein said first swath of fabric having a plurality of minuscule hooks extending outwardly from the exposed surface of said first swath of fabric, and said second swath of fabric having a plurality of minuscule loops extending outwardly from the exposed facade of said second swath of fabric.

20. A method of using a kit for assembling a headrest device for mounting onto a top part of a backrest of a chair in a vehicle, said method comprising: obtaining the kit comprising:

a headrest post having a generally U-shape configuration with a generally rectangular base and two substantially parallel prongs extending from the base of said headrest post;

a first swath of fabric attached to the rectangular base of said headrest post, said first swath of fabric having an exposed surface;

a plastic sleeve detachably attachable to the rectangular base of said headrest post; and a second swath of fabric attached to said plastic sleeve, said second swath of fabric having an exposed facade, wherein said second swath of fabric is detachably attachable to said first swath of fabric when said exposed facade of said second swath of fabric contacts said exposed surface of said first swath of fabric; and a cushion having an exterior, an interior, a stylized geometric sports ball shape and a centrally disposed orifice, said cushion attached to said plastic sleeve, wherein a portion of said plastic sleeve is mounted within the orifice of said cushion, wherein the stylized geometric sports ball shape of said cushion comprises a stylized geometric football shape;

affixing slidably the headrest post to top part of a backrest of the chair in the vehicle;

adjoining slidably the cushion to the base of the headrest post;

locking together the first swath of fabric to the second swath of fabric, wherein contacting the exposed surface of the first swath of fabric attached to the rectangular base of said headrest post to the exposed facade of the second swath of fabric attached to the attached to said plastic sleeve;

unlocking the locked together the first swath of fabric to the second swath of fabric, wherein detaching exposed surface of the first swath of fabric attached to the rectangular base of said headrest post from the exposed facade of the second swath of fabric attached to the attached to said plastic sleeve;

hoisting slidably upwards the cushion from the base of the headrest post; and removing slidably the headrest post from the top part of the backrest of the chair in the vehicle.

* * * * *